(No Model.) 8 Sheets—Sheet 1.

J. H. SHEARN.
Tag Machine.

No. 236,461. Patented Jan. 11, 1881.

Witnesses:
Robt. J. Gaylord
J. J. Greene

Inventor:
J. H. Shearn,
By W. E. Simonds
Atty.

(No Model.)  8 Sheets—Sheet 2.

J. H. SHEARN.
Tag Machine.

No. 236,461. Patented Jan. 11, 1881.

Witnesses:
Robt. F. Gaylord,
J. J. Greene

Inventor:
J. H. Shearn,
By W. E. Simonds
Atty.

(No Model.)
J. H. SHEARN.
Tag Machine.
No. 236,461. Patented Jan. 11, 1881.
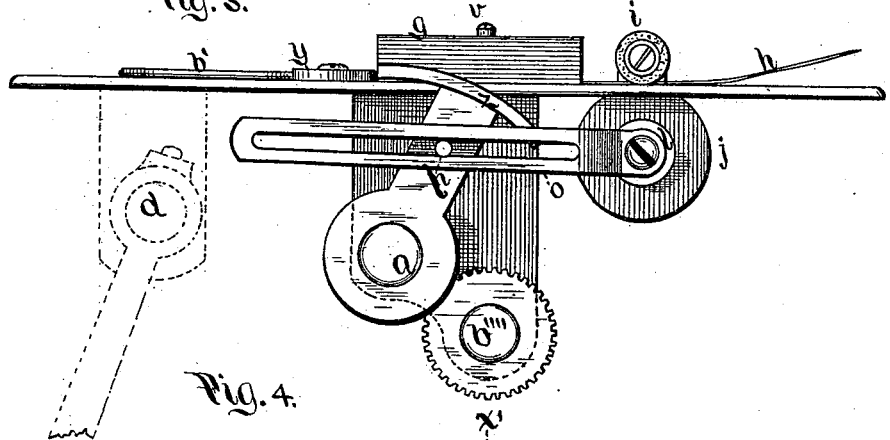
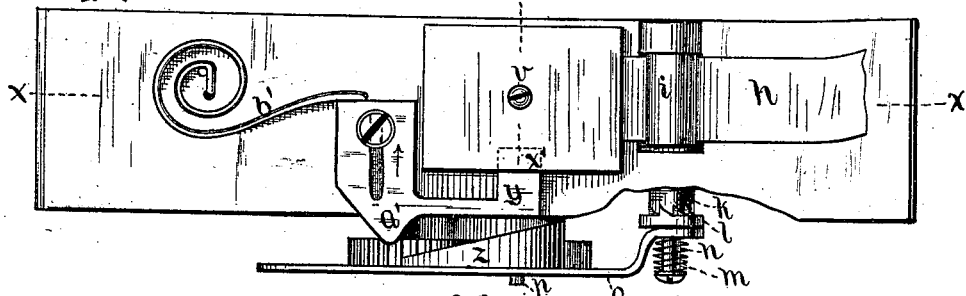
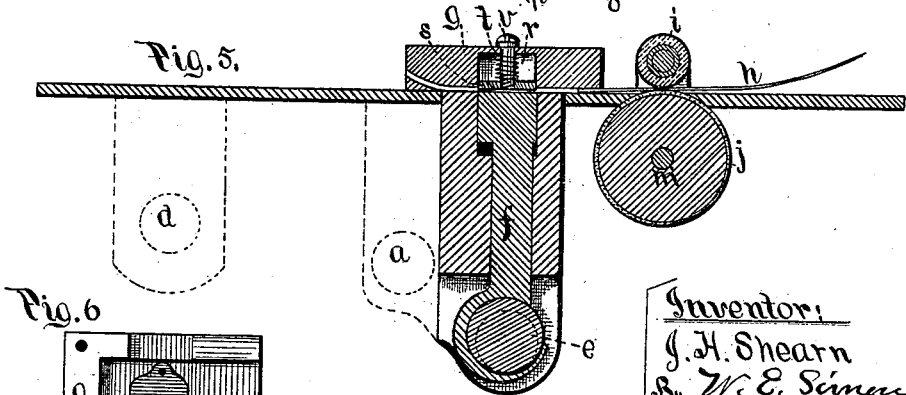
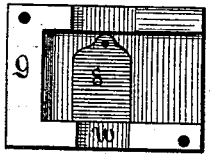
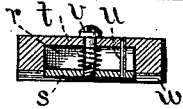
Inventor:
J. H. Shearn
By W. E. Simonds
Atty
Witnesses
R. T. Gaylord
J. J. Greene

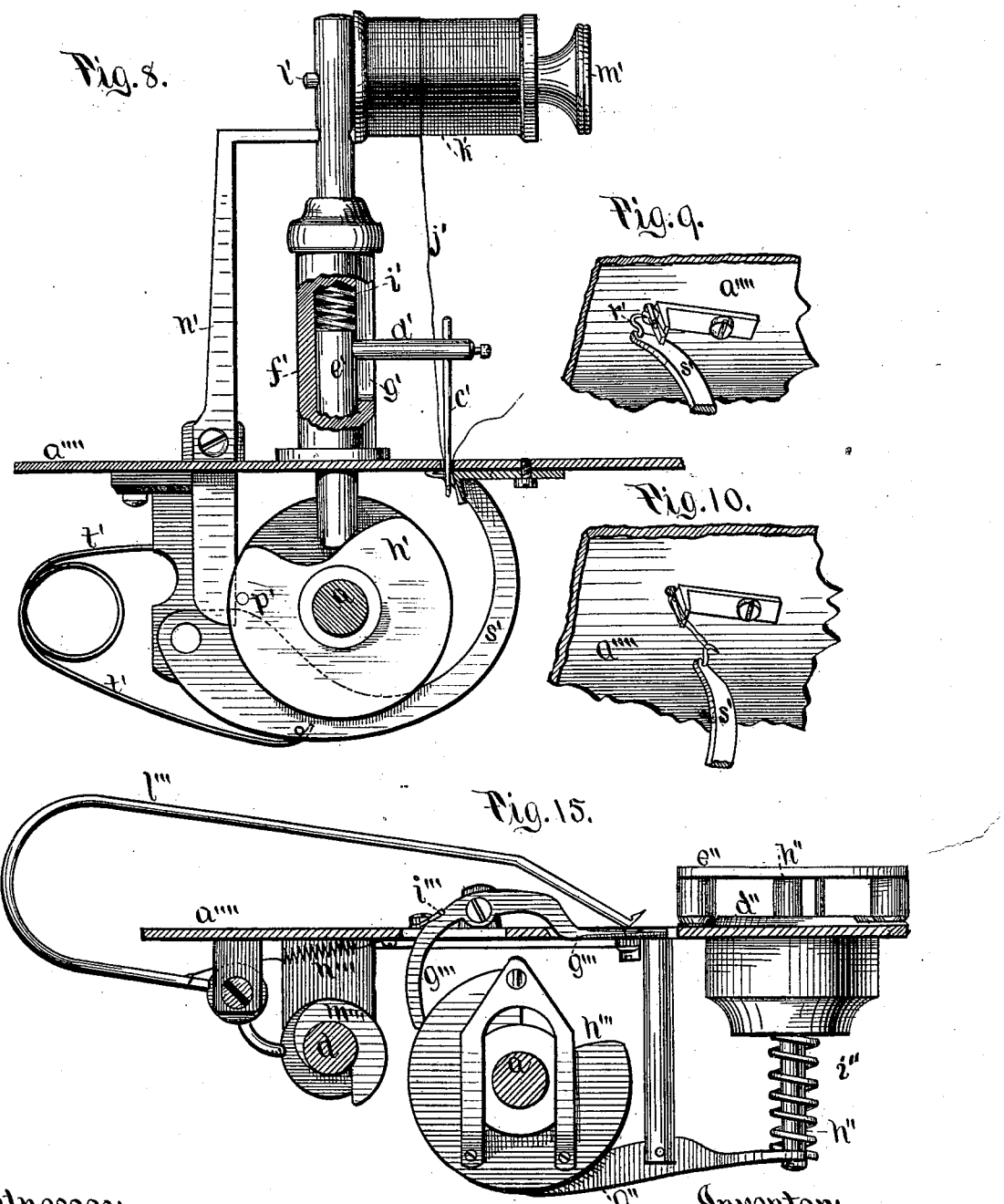

(No Model.) 8 Sheets—Sheet 5.

J. H. SHEARN.
Tag Machine.

No. 236,461. Patented Jan. 11, 1881.

Witnesses:
R. F. Gaylord
J. J. Greene

Inventor:
J. H. Shearn,
By W. E. Simonds
Atty

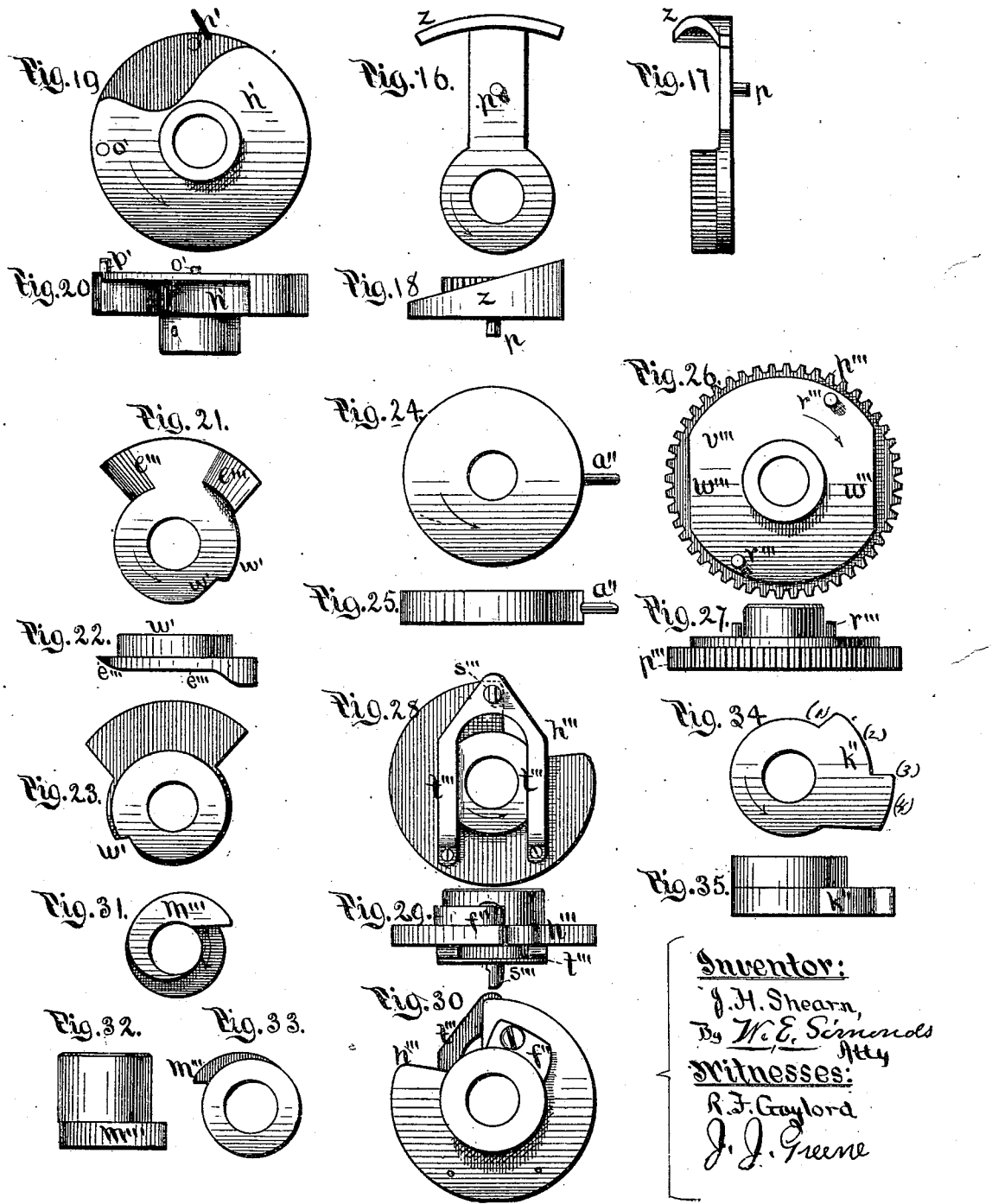

(No Model.) 8 Sheets—Sheet 7.
J. H. SHEARN.
Tag Machine.
No. 236,461. Patented Jan. 11, 1881.
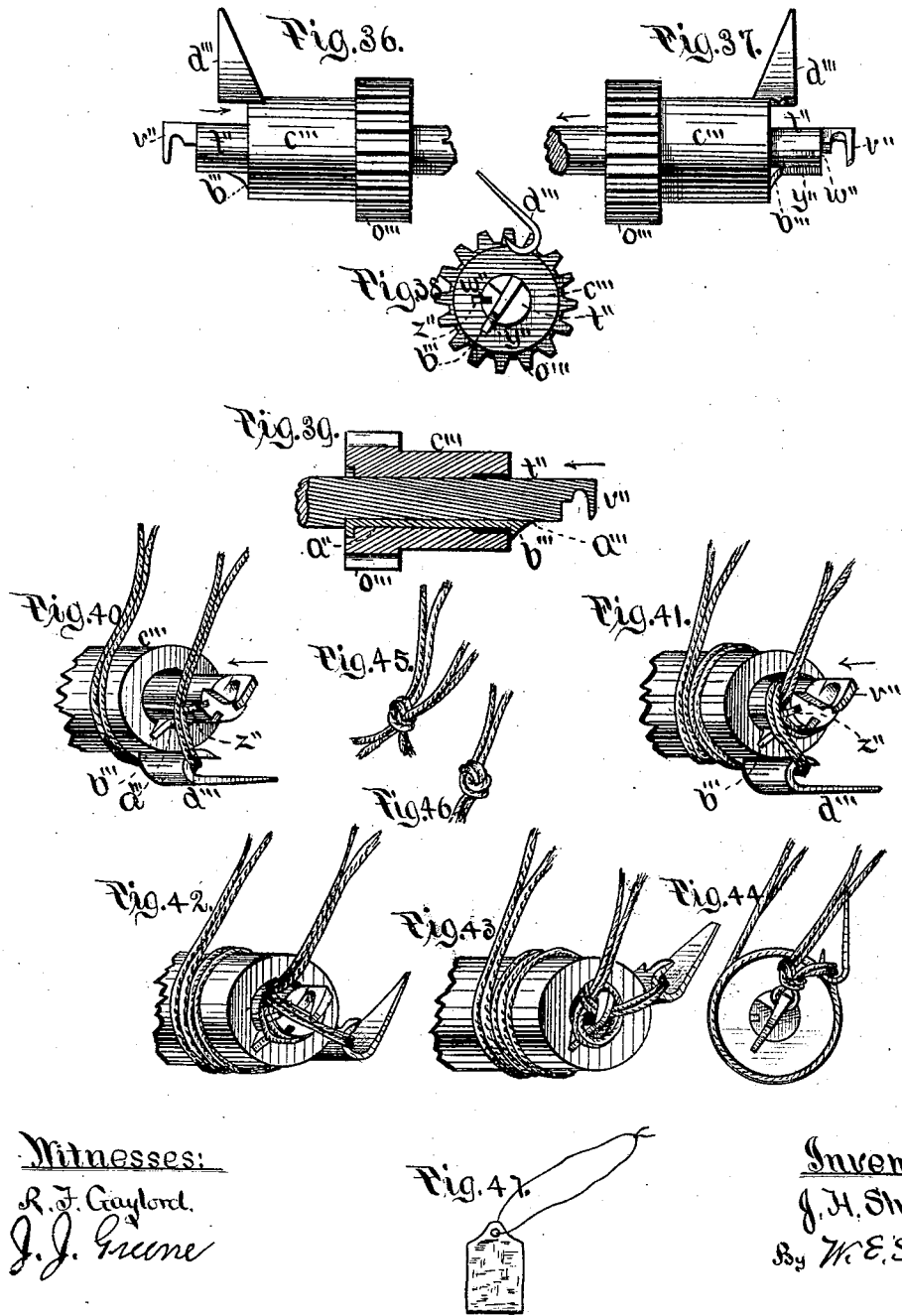

(No Model.) 8 Sheets—Sheet 8.

J. H. SHEARN.
Tag Machine.

No. 236,461. Patented Jan. 11, 1881.

Witnesses.
Wendell R. Curtis.
James J. Greene.

Inventor.
J. H. Shearn
By W. E. Simonds
Atty.

N. PETERS, PHOTO-LITHOGRAPHER, WASHINGTON, D.C.

UNITED STATES PATENT OFFICE.

JOSEPH H. SHEARN, OF LEEDS, MASSACHUSETTS.

TAG-MACHINE.

SPECIFICATION forming part of Letters Patent No. 236,461, dated January 11, 1881.

Application filed June 7, 1880. (No model.)

*To all whom it may concern:*

Be it known that I, J. H. SHEARN, of Leeds, in the county of Hampshire and State of Massachusetts, have invented certain new and useful Improvements in a Machine for Making Looped Tags, of which the following is a description.

The invention is of a machine which cuts out tags from blanks, and at the same operation puts a twine-hole in the tag, puts twine into the twine-hole, ties the twine into a loop in the tag, severs the loop from the stock-twine, and strings the looped tags on a receiving-arm.

Figure 1:
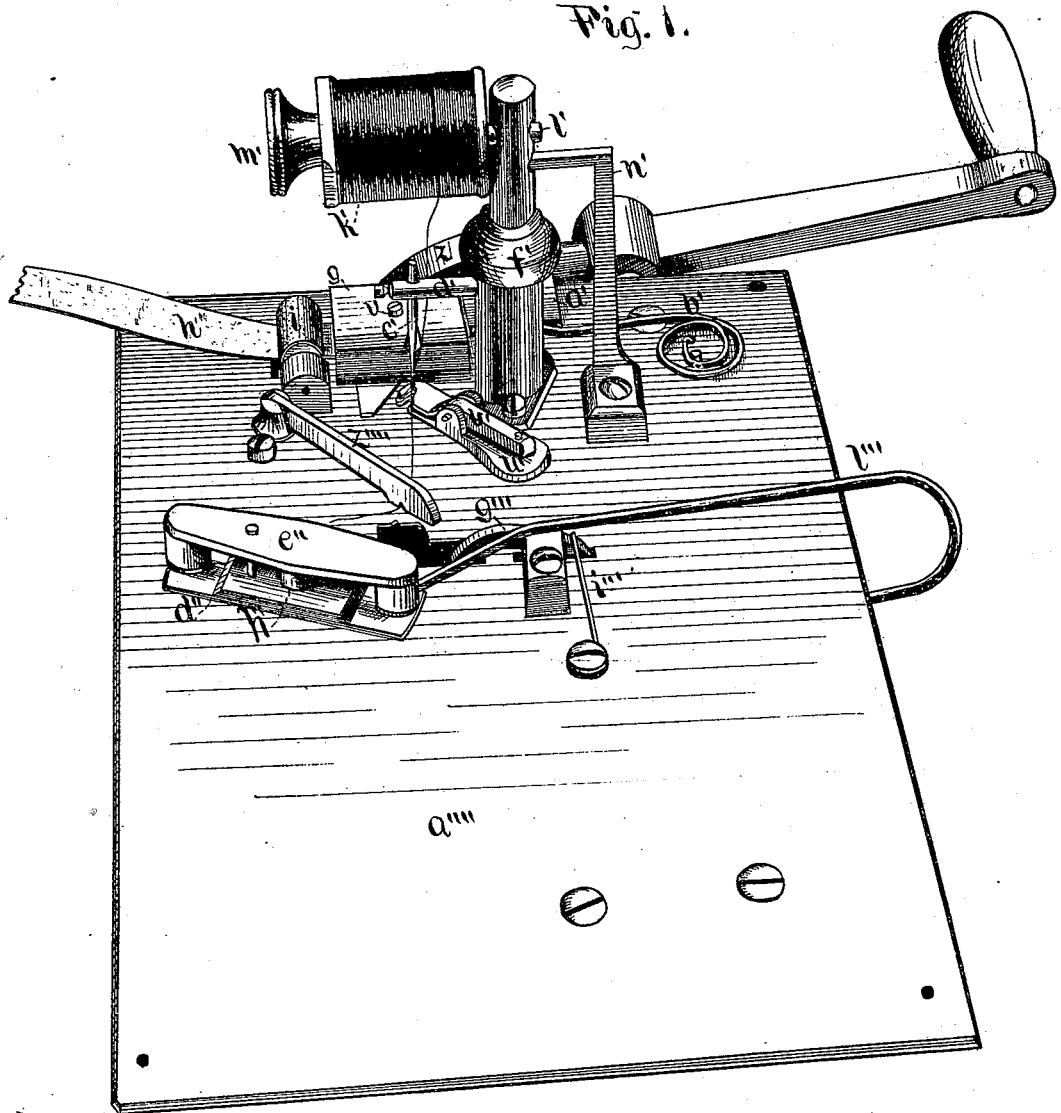
Figure 2:
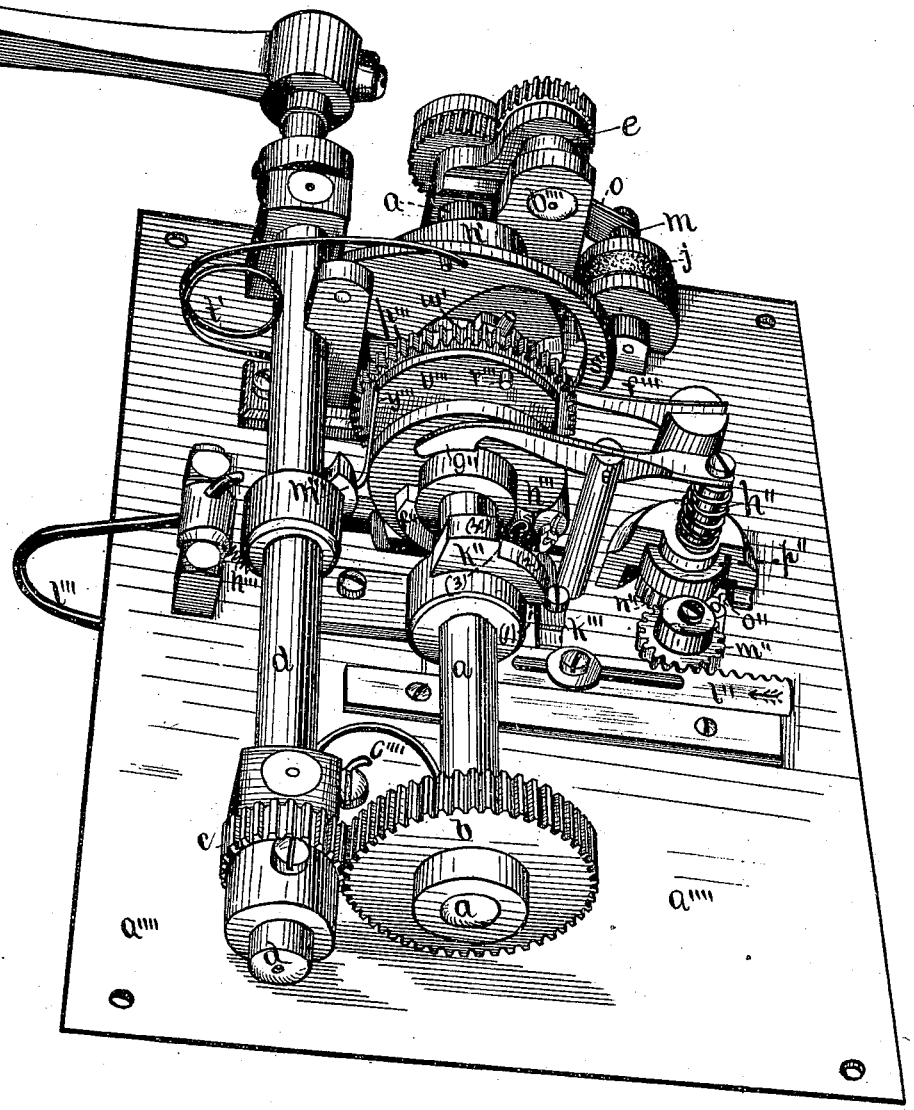
Figure 11:
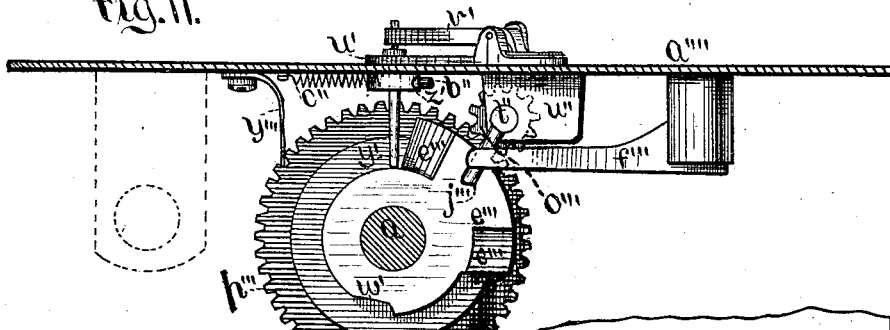
Figure 12:
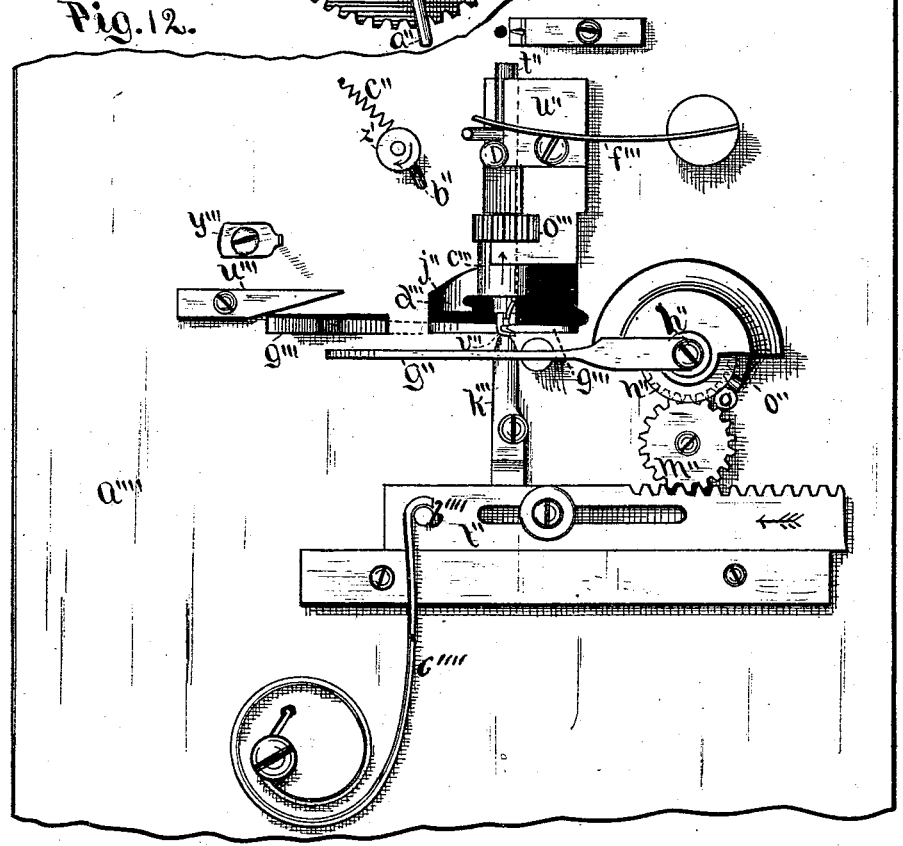
Figure 13:
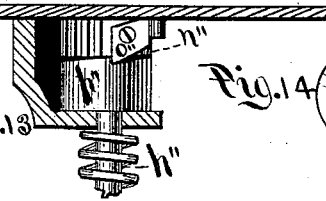
Figure 14:
Figure 48:
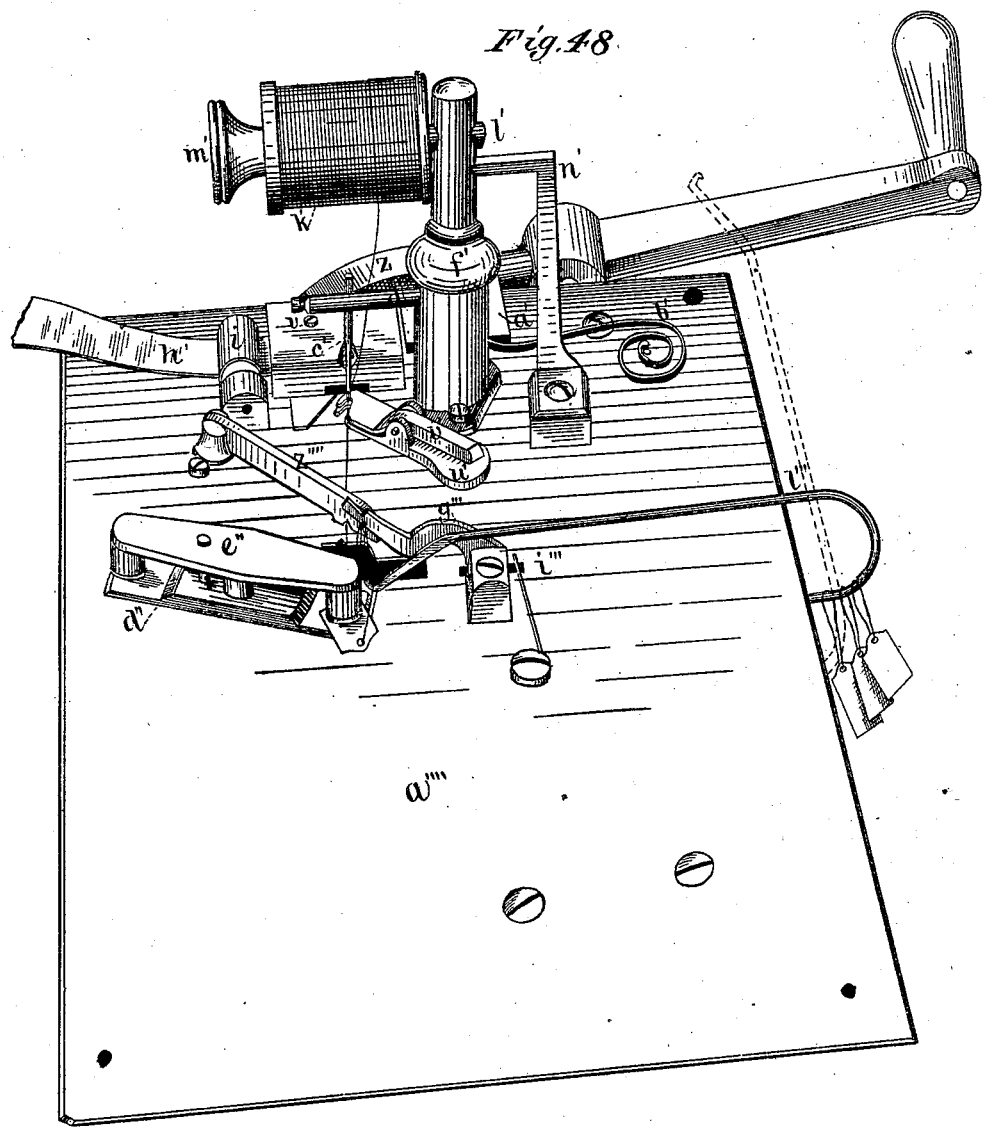

In the accompanying drawings, Figure 1 is a perspective view, showing the upper side of a table bearing my improvements. Fig. 2 is a perspective view, showing the under side of the table. Fig. 3 is a detail end view of the tag-punching apparatus. Fig. 4 is a top view of the parts shown in the last figure. Fig. 5 is a view of the parts shown in Figs. 3 and 4, in vertical section, on plane $xx$, Fig. 4. Fig. 6 is a bottom or under-side view of the die of the tag-punching apparatus. Fig. 7 is a view of the die shown in Fig. 6, in section, on plane $x'x'$, Fig. 4. Fig. 8 is a view (endwise as to the whole machine and cutting the table in cross-section) of the threading apparatus—i. e., the apparatus for inserting the twine into the hole in the tag. Fig. 9 is a view showing a portion of the under side of the table and the "singling-hook" just about to lay hold of the twine. Fig. 10 is a detail view, similar to Fig. 9, showing the singling-hook after it has started to "single" the twine. Fig. 11 is a view (endwise as to the whole machine and cutting the table in cross-section) showing the first clamping-carrier and its operating and adjacent parts. Fig. 12 is a view of the under side of the table and the parts attached thereto (receiving-arm and feed-rolls excepted) with the rotary shafts and parts carried thereby removed. Fig. 13 is a view showing parts, under the table, appurtenant to the second clamping-carrier. Fig. 14 is a view of the top of the collar shown in side view in Fig. 13. Fig. 15 is a view (endwise as to the whole machine and cutting the table in cross-section) showing the knot-tightener, receiving-arm, second clamping-carrier, and some of their operating parts. Fig. 16 is a side view of the cam which operates the tag-ejector. Fig. 17 is an edge view of same. Fig. 18 is a peripheral view of same. Fig. 19 is a side view of the cam seen in Fig. 8. Fig. 20 is a peripheral view of same. Fig. 21 is a side view of the French cam seen in Fig. 11. Fig. 22 is a peripheral view of same. Fig. 23 is a view of opposite side of same. Fig. 24 is a side view of the pin-disk seen in Fig. 11. Fig. 25 is a peripheral view of same. Fig. 26 is a side view of the gear lettered $p'''$, disk lettered $v'''$, and pins on the side thereof, shown in Fig. 11. Fig. 27 is a peripheral view of same. Fig. 28 is a side view of the cam which operates the knot-tightener and parts borne thereon. Fig. 29 is a peripheral view of same. Fig. 30 is a view of the opposite side thereof. Fig. 31 is a side view of the cam which operates the receiving-arm. Fig. 32 is a peripheral view of same. Fig. 33 is a view of the opposite side of same. Fig. 34 is a side view of the cam which operates the second clamping-carrier. Fig. 35 is a peripheral view of same. Fig. 36 is a side view of the knot-tying device. Fig. 37 is a view of the opposite side thereof. Fig. 38 is an end view of same. Fig. 39 is a view of same in central longitudinal section, (all enlarged.) Fig. 40 is a view showing the first stage of tying the knot. Fig. 41 shows a subsequent stage of same. Fig. 42 shows a still later stage of same. Fig. 43 shows a still later stage of same. Fig. 44 is an end view of same parts, showing a still later stage of same, with the knot tied and tightened. Fig. 45 shows the tied knot severed from the knot-tying device, but still holding to an end of the stock-twine. Fig. 46 shows the finished knot with the stock-twine drawn out of it. Fig. 47 is a view of the final product of the machine, a tag with a loop of twine tied into it. Fig. 48 is a view much the same as Fig. 1, but with the knot-tightener having tightened the knot and the point of the receiving-arm entered into the loop. The dotted line denotes the position of the receiving-arm raised or thrown backward.

$a$ denotes the main shaft; $b$, gear on the same, meshing into gear $c$ on shaft $d$, and thereby driving shaft $d$. The shaft $b''''$ carries the eccentric $e$, which operates—i. e., gives vertical reciprocation to—the punch $f$, which, co-operating with the die $g$, punches out the tags. The tag-blank $h$ is fed to the punch and die by the intermittent rotation of the rubber-covered rolls $i\ j$, which intermittent rotation is attained by means of the clutch-half $k$, fixed to the lower roll, $j$, the clutch-half $l$, rotarily and longitudinally loose on shaft $m$, and pressed to engagement with the other clutch-half by the spring $n$, the slotted arm $o$, fixed to clutch-half $l$, and the crank-pin $p$, entering the slot in arm $o$. When the free end of arm $o$ moves downward, the two clutch-halves engage, and the two rolls $i\ j$ rotate and feed the tag-blank to the punch and die. When the free end of arm $o$ moves upward, the spring $n$ allows clutch-half $l$ to slide on clutch-half $k$, which, with the two rubber-covered rolls, remains stationary, meanwhile giving an interval in the feed of the tag-blank, wherein the punch operates to cut out a tag therefrom. When the punch operates, it shoves the tag which it cuts from the blank up into the die-recess $r$, and then retreats downward till the face—i. e., upper end—of the punch is flush with the upper side of the tag-blank, and the ejector $s$, located within the die-recess and actuated by the spring $t$, forces the tag just cut down and out of the recess, leaving it lying on the face of the punch. Meanwhile, the twine-hole punch $u$, fixed in the die $g$ and projecting through the ejector, has punched a hole in the tag for the reception of the twine. The letter $v$ denotes a headed adjusting-screw, screwed into the ejector and carried by it, which passes out at the top of the die. By the adjustment of this screw—i. e., screwing it up or down in the ejector, and thereby making the head of the screw strike correspondingly sooner or later on the top of the die—the downward movement of the ejector is stopped at any desired point, and its pressure on the tag just cut is correspondingly stopped at any desired point; this to adapt the punching apparatus to cutting tags from blanks of different thicknesses. A cross-slot, $w$, is cut in the face of the ejector to give a path for the tag-carrier, soon hereinafter referred to.

The letter $y$ denotes said tag-carrier, moved by cam $z$ striking on tappet $a'$, and retracted by spring $b'$ pushing the tag just cut along (in the direction denoted by the arrow on the tag-carrier) till the twine-hole in the tag is directly in the path of the vertically-reciprocating twine-needle $c'$, carried on a lateral arm, $d'$, fixed to a rod, $e'$, reciprocating vertically within the pillar $f'$, (which is open by mortise $g'$ on the side, to allow the movement of the lateral arm,) its upward movement being given by the cam $h'$ and its downward movement by the spring $i'$. The twine $j'$ is borne on the spool $k'$, hung on the lateral arm $l'$, and secured thereon by nut $m'$.

The letter $n'$ denotes a pivoted brake, which, actuated by pins $o'$ and $p'$, at appropriate times holds the spool fast from rotation, so that twine may not escape when it ought not. The twine-hole in the tag being, as mentioned, directly under the needle, and the needle being threaded—i. e., having twine coming from the spool passed through the eye of the needle with a suitable length of loose end—the needle moves downward, passing through the twine-hole and carrying the twine doubled, one strand on each side of the needle, and as soon as the needle starts to return upward the twine is opened slightly into a loop, as seen in Fig. 9, because there is nothing to draw the thread back through the twine-hole. At this time the singling-hook $r'$, borne on the rotarily-reciprocating singling-arm $s'$—which is pivoted at its rear end, having its downward movement given by pin $p'$ and its upward movement by spring $t'$—lies up against the table, and, starting downward, as seen in Fig. 10, it catches into the loop of the twine, (on that side of the needle next the loose end of the twine,) and draws the loose end down through the twine-hole, and leaves it hanging downward, so that when the needle has returned to the top of its play a single line of twine is left hanging from the eye of the needle passing down through the twine-hole and hanging down below. While the twine is being thus carried down through the twine-hole and "singled" the tag is held in the grasp of a clamp-carrier composed of the rotarily (laterally) reciprocating arm $u'$ and the clamp-lever $v'$, pivoted thereon. This clamp-lever is operated by the cam $w'$ through the intermediate rod, $y'$. The arm $u'$ has the hub or shaft $z'$, and at the appropriate time—i. e., after the twine-hole is threaded and the twine singled—the arm $u'$ is (partially and laterally) rotated—by pin $a''$-striking on pin $b''$, appurtenant to the hub $z'$—in the direction denoted by the overlying arrow, and the retractile movement is given by the spring $c''$. When the clamping-carrier thus moves outward it carries the clamped tag with it, leaving the twine trailed in a double line behind it, and presents the tag to another clamping-carrier, composed of the laterally-rotating arm $d''$ and the clamp $e''$, which grasps the tag as the first clamping-carrier releases it, which (the first clamping-carrier) then returns to its first or normal position. The clamp $e''$ is operated by the cam $f''$, through the medium of the lever $g''$ and the vertical rod $h''$, the retractile (upward) movement being given by the spring $i''$. After this second clamping-carrier grasps the tag it (by lateral rotation) carries it across the tying-mortise $j''$, leaving the twine trailed in two lines across this mortise, and then holds it till the tying of the knot is accomplished, when it releases the tag, to be taken away by the final receiving-arm, (of which more hereinafter,) and its fellow or counterpart (for this second clamping-carrier is double) repeats the operation, and so on indefinitely. These intermittent rotary motions of the second clamping-carrier are given by the cam $k''$, through the medium of the ratch $l''$, the pinions $m''\ n''$, the pawl $o''$, and the collar $p''$, appurtenant to the hub of the arm $d''$, and provided with two teeth, $r'''\ s''$, co-operating with the pawl—that is, the shoulder 1 on cam $k''$ (see Figs. 2, 12, 13, 14, 34, 35,) strikes on pin $b''''$, projecting from ratch $l''$, and moves the ratch longitudinally in the direction denoted by the overlying arrow. Then, while pin $b''''$ rides cam-surface 2, the ratch remains stationary. Then shoulder 3 on this cam moves the ratch still farther longitudinally in the same direction. Then the ratch remains stationary, while pin $b''''$ rides cam-surface 4. When the pin drops off this surface the spring $c''''$ returns the ratch to its first position. This intermittent reciprocating motion of the ratch becomes an intermittent rotary reciprocating motion in the pinions $m''$ $n''$, and—through the medium of pawl $o''$ (hung on pinion $n''$, see Fig. 13) acting on ratch-teeth $r''\ s''$, (appurtenant to collar $p''$)—in collar $p''$ and arm $d''$ an intermittent rotary motion in one direction.

I will now describe the knot-tying apparatus. The knot it ties is a "single knot," tied in the two lines of twine at once; and as a preliminary to the attempt to understand the construction and operation of this knot-tying apparatus, it will be well for the reader to take a piece of twine and, winding it around two fingers, tie a single knot in the twine, and carefully observe the relative motions of the two strands or ends as the knot progresses The letter $t''$ denotes a non-rotary shaft having appropriate longitudinal movement in the bearing-block $w''$. On the end of it is a hook, $v''$. In its surface are two longitudinal slots, $w''$ and $y''$, the former of which contains the twine-retainer $z''$, (an outwardly-pressing spring with a hook at the end, without longitudinal movement in the slot which holds it,) and the latter of which contains the hook-closer $a'''$, (having longitudinal movement in the slot which holds it, it being hung in a fixed relation to the sleeve $c'''$, hereinafter mentioned, and having the twine-guard $b'''$ formed thereupon.) The letter $c'''$ denotes a sleeve, larger in diameter than shaft $t''$ and rotary thereon, bearing fixed thereto the rotating hook $d'''$, an edge of which runs down to the surface of the rotary sleeve, and the other edge of which runs down to overhang the exposed surface of shaft $t''$.

The letter $e'''$ denotes a French cam—i. e., a rotating disk with the cam on its side—which gives shaft $t''$ its longitudinal movement in one direction, the retractile movement being given by a spring, $f'''$, bearing against a pin on shaft $t''$. The twine, as before mentioned, trailing back from the tag in a double line across the tying-mortise, the rotary hook $d'''$ catches it and distributes one (double) line on and around the surface of sleeve $c'''$, and the other (double) line on and around shaft $t''$, as seen in Fig. 40. The knot is to be tied in that line which is around shaft $t''$. Just after the hook $d'''$ has made one complete rotation, after catching hold of the twine, and as the second revolution commences—the twine now being crossed just as a person first crosses it in tying it around the fingers—the shaft $t''$ moves longitudinally in the direction indicated by the near-by arrow, Fig. 41, which gives the line of twine on shaft $t''$ a lateral cross, the beginning of it being shown in Fig. 41, and the completion in Fig. 42. While this is being done the retainer $z''$ has kept the twine from slipping off the end of shaft $t''$, but the guard $b'''$ on the hook-closer has been pushing the twine toward such end. As the shaft $t''$ moves farther endwise, still in the same direction, it presses the retainer down into its slot till it ceases to rise above the surface of the shaft, and the guard pushes the twine off the end of shaft $t''$. Meanwhile the hook $d'''$ has continued to rotate, and again crossed the twine in a direction opposite to the cross first mentioned, which gives the three crosses or complete twist requisite to the forming of a single knot, and has laid its strand into hook $v''$, and hook-closer $a'''$ has met hook $v''$, so that the strand last mentioned is imprisoned, (a position of affairs represented in Fig. 43,) the knot being all formed, but not drawn tight. Now the knot-tightener $g'''$ (a pivoted lever lying in the tying-mortise and having its movements given by cam $h'''$ and spring $i'''$) rises, drawing the knot tight, (see Fig. 48,) and leaving the hook $v''$ tied in a small loop of the twine, as seen in Fig. 44. The knot being tied, the pin $j'''$ drops off cam $e'''$, and the spring $f'''$ returns shaft $t''$ to its normal position, which movement carries the small loop last mentioned against the stationary knife $k'''$, and severs the loop, and by the same cutting severs the loop now tied into the tag from the stock-twine, which (the stock-twine) is still in the knot, as shown in Fig. 45. Just before the knot-tightener $g'''$ rises, the pivoted receiving-arm $l'''$, actuated by cam $m'''$ and spring $n'''$, falls upon the doubled twine, between the tag and the tightener, and close to the tag. (See Fig. 48.) When the tightener rises, the two lines of twine, from the tag to the tightener, rise at two different angles, (for one line runs under the tag and the other over the tag,) leaving the point of the receiving-arm between the two lines and within the loop appurtenant to the tag. Now the receiving-arm rises and the tag is strung by its loop of twine upon the receiving-arm, and the end of the stock-twine is drawn out of the knot, as seen in Fig. 46.

The intermittent rotary motion of sleeve $c'''$ and hook $d'''$ is given as follows: The sleeve bears the pinion $o'''$, driven by the gear $p'''$, which has upon its side two pins, $r'''$, alternately operated upon by pin $s'''$, borne on spring $t'''$, and rotating with the main shaft till the pins are unmeshed by the spring striking on tappet $u'''$. (See Fig. 12.) The gear $p'''$ has upon its side the disk $v'''$, bearing on its periphery two flattened surfaces, $w'''$, which, when the pins unmesh, are pressed upon by spring $y'''$, and the gear, pinion, sleeve, and hook thereby held for the time being in proper position.

The letter $z'''$ denotes a pivoted arm between the two clamp-carriers, which lies upon the thread and assists it to retain its position in contact with the table $a''''$.

I disclaim as my invention the herein-described combination of feed-rolls, punch, and die (for cutting out the tag) and the laterally-moving tag-carrier.

I claim as my invention—

1. The combination of the feed-rolls $i\ j$, clutch-halves $k\ l$, slotted arm $o$, pin $p$, with its crank-arm, eccentric $e$, punch $f$, die $g$, ejector $s$, adjusting-screw $v$, and twine-hole punch $u$, all substantially as described, and for the purpose set forth.

2. The combination of the feed-rolls, the punch and die $f\ g$, the laterally-moving tag-carrier $y$, and the twine-needle $c'$, all substantially as described, and for the purpose set forth.

3. The combination of the tag-carrier $y$, the needle $c'$, and the vibratory singling-hook $r'$, all substantially as described, and for the purpose set forth.

4. The combination of the needle $c'$, the spool $k'$, and the intermittently-operating brake $n'$, all substantially as described, and for the purpose set forth.

5. The combination of the tag-carrier $y$, the needle $c'$, and the clamping-carrier $u'\ v'$, all substantially as described, and for the purpose set forth.

6. The combination of the rotarily-reciprocating arm $u'$, pins $a''\ b''$, spring $c''$, clamp-lever $v'$, cam $w'$, and rod $y'$, all substantially as described, and for the purpose set forth.

7. The combination of the punch and die $f\ g$, the tag-carrier $y$, the needle $c'$, singling-hook $r'$, and the clamping-carrier $u'\ v'$, all substantially as described, and for the purpose set forth.

8. The combination of the rotary arm $d''$, clamp $e''$, cam $f''$, lever $g''$, rod $h''$, and spring $i''$, all substantially as described, and for the purpose set forth.

9. The combination of the clamp $e''$, rotary arm $d''$, cam $k''$, ratch $l''$, pinions $m''\ n''$, pawl $o''$, collar $p''$, and teeth $r''\ s''$, all substantially as described, and for the purpose set forth.

10. The combination of the table provided with the tying-mortise $j''$, the rotary sleeve $c'''$, carrying hook $d'''$, and the longitudinally-moving shaft $t''$, all substantially as described, and for the purpose set forth.

11. The combination of the rotary sleeve $c'''$, carrying the hook $d'''$, the longitudinally-moving shaft $t''$, having the hook $v''$, the twine-retainer $z''$, and the hook-closer $a'''$, all substantially as described, for the purpose set forth.

12. In combination with the knot-forming apparatus, the knot-tightener $g'''$, for drawing the knot tight, all substantially as described, and for the purpose set forth.

13. In combination with the longitudinally-moving shaft $t''$, (as a part of the knot-tying apparatus,) the knife $k'''$, all substantially as described, and for the purpose set forth.

14. The combination of the table provided with the mortise $j''$, the knot-forming apparatus, the knot-tightener $g'''$, and the knife $k'''$, all substantially as described, and for the purpose set forth.

15. The combination of the clamping-carrier $d''\ e''$, the knot-tightener $g'''$, and the vibratory receiving-arm $l'''$, all substantially as described, and for the purpose set forth.

16. The combination of the tag-punching device, the needle, and the knot-tying device with the intermediate tag-carriers, substantially as described, and for the purpose set forth.

17. The combination of the tag-punching device, the twine-needle, the knot-tying device, and the receiving-arm with the intermediate tag-carriers, all substantially as described, and for the purpose set forth.

JOSEPH H. SHEARN.

Witnesses:
EMERY C. DAVIS,
FREDERICK C. SHEARN.